United States Patent [19]

Paikert et al.

[11] Patent Number: 5,086,831
[45] Date of Patent: Feb. 11, 1992

[54] ARRANGEMENT FOR THE CATALYTIC OXIDATION OF THE HARMFUL COMPONENTS IN A COOLED CARRIER GAS OF A TECHNICAL PROCESS

[75] Inventors: Paul Paikert, Witten; Werner Rudowski; Clemens Ruff, both of Bochum, all of Fed. Rep. of Germany

[73] Assignee: GEA Luftkühler GmbH

[21] Appl. No.: 693,699

[22] Filed: Apr. 30, 1991

[30] Foreign Application Priority Data

May 4, 1990 [DE] Fed. Rep. of Germany ....... 4014415

[51] Int. Cl.[5] .................... F28D 15/02; F28F 13/14
[52] U.S. Cl. ................... 165/47; 165/104.14; 165/146; 165/909; 165/133; 165/78; 422/173; 422/206
[58] Field of Search .............. 165/104.14, 146, 47, 165/909; 422/173, 175, 206

[56] References Cited

U.S. PATENT DOCUMENTS 2,153,942 4/1939 Spalding, Jr. ................... 165/104.21

FOREIGN PATENT DOCUMENTS 2343495 3/1975 Fed. Rep. of Germany ...... 422/173
198987 12/1982 Japan ................................. 165/146
1368578 1/1988 U.S.S.R. ............................ 165/146

Primary Examiner—Albert W. Davis, Jr.
Attorney, Agent, or Firm—Toren, McGeady & Associates

[57] ABSTRACT

An arrangement for the catalytic oxidation of the harmful components in a cooled carrier gas from a technical process. The arrangement includes two parallel gas ducts which are connected at one end through a bend and whose other ends are connected to gas lines for the carrier gas and for purified gas. The gas ducts are connected to each other through a three-stage thermal energy return unit. The exchanger stage of the thermal energy return units are arranged spaced from each other and are composed of individual heat tubes whose number increases from exchanger stage to exchanger stage. The size ratio of the heat-exchanging surfaces of heating part to cooling part of each exchanger stage decreases in flow direction of the carrier gas from exchanger stage to exchanger stage. The catalyst is integrated in the gas duct for the carrier gas immediately downstream of the heating part of the last exchanger stage.

15 Claims, 4 Drawing Sheets 5,086,831

ARRANGEMENT FOR THE CATALYTIC OXIDATION OF THE HARMFUL COMPONENTS IN A COOLED CARRIER GAS OF A TECHNICAL PROCESS

BACKGROUND OF THE INVENTION

1. Field of the Invention

The present invention relates to an arrangement for the catalytic oxidation of environmentally harmful components in a cooled carrier gas of a chemical-technical or physical-technical process. In the arrangement, the purified gas to be conducted into the atmosphere is in heat-exchanging contact through a multipass heat exchanger with the carrier gas upstream of the catalyst.

2. Description of the Related Art

In a number of technical processes, for example, in the manufacture of phthalic anhydride or maleic anhydride, the desired product cannot be completely obtained from the carrier gas. A small amount of the product remains in the carrier gas. Also remaining in the carrier gas are hydrocarbon portions which cannot be converted in the process. The hydrocarbon portions reach together with the carrier gas the atmosphere through the stack of the plant used in the chemical-technical or physical-technical process and represent a burden on the environment.

Because of the continuously increasing awareness with respect to environmental protection, the regulations of many countries concerning emissions require that the abovementioned product residues as well as the hydrocarbon portions are removed before the carrier gas reaches the atmosphere in order to avoid harmful influences on the environment. In the past, thermal combustion and catalytic oxidation were available for this purpose.

Although the product residues as well as the hydrocarbon portions are burned without problems in the thermal combustion because of the high combustion temperatures, there is still the problem that simultaneously a large quantity of nitric oxides are produced which are also harmful to the environment. The reason for the production of nitric oxide is the high nitrogen portion contained in the combustion air. As a consequence, in actual practice the catalytic oxidation which is conducted at lower temperatures is used more and more because this method removes the product residues as well as the hydrocarbon portions, while not releasing any additional nitric oxides.

In a known arrangement for the catalytic oxidation, the carrier gas which contains product residues as well as hydrocarbon portions is in heat-exchanging contact befor being admitted to the catalyst with the purified gas discharged from the catalyst, in order to reach the so-called start-up temperature of the catalyst. In other words, the temperature increase of the purified gas resulting from oxidation is utilized for raising the carrier gas to the necessary start-up temperature by means of a heat exchange with the carrier gas. For this purpose, a single-stage multipass heat exchanger is used in which the carrier gas is conducted in a transverse flow to the purified gas.

However, such a heat exchanger has the disadvantage that the expenses are very high for conducting the carrier gas and the purified gas in a channeled manner because of the necessary deflections of the gas ducts upstream and downstream of the heat exchanger. This is particularly significant if it is considered that not infrequently volumetric flows of 100,000 Nm:/h must be handled.

Another deficiency of the known arrangement resides in the fact that frequently interruptions of the operation take place which endanger the overall process. The reason for these interruptions in the operation is the fully saturated carrier gas which emanates from the main process and is laden with residue materials. The carrier ga is at the dew point with respect to the precipitated product. As a result, it cannot be avoided that small amounts of the precipitated products are conducted along in finely distributed drop-shaped form or in solid form and are deposited on the surfaces of the heat exchanger. In addition, corrosion and/or cloggings may occur.

SUMMARY OF THE INVENTION

Therefore, it is the object of the present invention to improve an arrangement of the above-described type. In particular, the operation of the arrangement is to ensure maximum flexibility while being simple to maintain and easily accessible. Also, economical concerns as well as concerns of process technology and safety technology are to be taken into consideration.

In accordance with the present invention, the carrier gas and the purified gas are conducted in gas ducts which extend parallel to each other and the gas ducts are connected to each other through an at least two-stage thermal energy return arrangement composed of heat tubes. The size ratio of the heat-exchanging surfaces of heating part to cooling part of each exchanger stage decreases in flow direction of the carrier gas from exchanger stage to exchanger stage. The catalyst is arranged immediately downstream of the heating part of the last exchanger stage.

The arrangement according to the present invention provides the particular advantage that the expenses required for conducting the carrier gas and the purified gas in a channeled manner are significantly reduced. Since heat tubes are used, the two gas flows can now be conducted over the entire heat exchanging range parallel to each other and next to each other. Only straight gas ducts are required which in addition, only require an intermediate wall for separating the gas flows. The intermediate wall may additionally carry out a support function for the heat tubes. The two straight gas ducts only have to be connected to each other in the region downstream of the catalyst by means of a simple 180° bend. As a result, the arrangement is very compact and can be operated in a horizontal arrangement as well as in a vertical arrangement depending on the local requirements. Consequently, the possibilities for use of the arrangement according to the present invention are substantially increased.

Another significant advantage of the present invention is the fact that the thermal energy return arrangement of heat tubes is a multi-stage arrangement. As a result, the two components of each exchanger stage, i.e., the cooling part to which purified gas is admitted as well as the heating part to which carrier gas is admitted, can be adapted in a specific and flexible manner to the respective process conditions.

In this regard, it is also of significant importance that especially the first exchanger stage in flow direction of the carrier gas is constructed with respect to the size ratio of the heat-exchanging surfaces of heating part to cooling part in such a way that the operating temperature in the interior of the heat tube is increased and is substantially raised close to the higher gas temperature. As a result of this measure, the temperature of the tube walls of the critical heat tube sections to which carrier gas is admitted is increased and, thus, the safety is substantially increased.

Another advantage of the present invention is the fact that the heat tubes act as a preheater of the carrier gas which is cooled in the actual technical process of obtaining the product and that the heat tubes act as an aftercooler of the purified gas for the catalytic oxidation, so that the heat tubes act as a rectifier for the volumetric flows of the gas which, in turn, means that the conversion possibilities during the oxidation in the catalyst are utilized in an optimum manner.

The rate of conversion during the oxidation of the hydrocarbon portions in the carrier gas is dependent to a significant degree on the local flow velocity of the carrier gas in the catalyst. If this local flow velocity is nonuniform, the conversions are also non-uniform. In other words, the catalyst operates with locally different efficiencies. Thus, at locations with higher gas velocity, the efficiency is lower than at locations with slower velocity. Therefore, in order to obtain the desired efficiency, it is important to ensure a flow velocity in the catalyst which is as uniform as possible.

In accordance with the present invention, this is achieved by arranging the catalyst immediately and in a straight line downstream of the heating part of the last exchanger stage in flow direction of the carrier gas (end stage). Since the temperature is completely uniformly distributed over the length of the heat tubes, the heat tubes also contribute to the optimum utilization of the properties of the catalyst.

Because of the use of heat tubes, heat can be obtained from the purified gas downstream of the catalyst and the carrier gas can be preheated upstream of the catalyst, wherein the heat tubes ensure a uniform temperature distribution as well as a uniform velocity distribution over the entire cross-section of the catalyst. This is because the conversion rate in the catalyst is dependent in the same manner on the local temperature of the carrier gas flowing through the catalyst, i.e., locations having a higher gas temperature reach a higher degree of conversion than locations with lower gas temperature.

Another advantage of the heat tubes is that the heat tubes are completely independent of each other. Since each tube constitutes a closed operating system, when a heat tube is damaged for any reason, for example, by corrosion or other local or even accidental influences, such as, a faulty welding seam of a heat tube, etc., this does not result in a failure of a complete heating part or cooling part, only the damaged heat tube fails whose output is merely a fraction of the total output and whose failure does therefore not lead to a significant impairment of the catalytic oxidation.

Therefore, it is possible by means of the present invention to heat a carrier gas which is frequently supplied with a temperature of about 50° C. by means of the additional thermal energy produced by the catalytic oxidation in the catalyst to the so-called start-up temperature of the catalyst of about 300° C., without having to supply the necessary heat energy from outside. On the other hand, the invention makes it possible to cool the purified ga leaving the catalyst to an advantageous stack temperature of about 100° C. to 120° C.

In accordance with an advantageous feature, the number of heat tubes increases from exchanger stage to exchanger stage in flow direction of the carrier gas. This makes it possible to adapt very sensitively the individual exchanger stages to the respective process conditions. For example, in an advantageous embodiment of a three-stage thermal energy return arrangement, the first exchanger stage may include a narrow assembly of tubes in flow direction with about 8-12 rows of tubes. The second exchanger stage is equipped with about 20-24 rows of tubes, while the third and last exchanger stage is equipped with about 30-36 rows of tubes. Thus, the warmer the gas flows are, the more rows of tubes are provided in each exchanger stage.

A preferred further development of the present invention provides that the heat tube section in the heating part of the first exchanger stage in flow direction of the carrier gas is smooth, i.e., has no ribs, while the heat tube section in the cooling part has ribs. This feature takes into account that in the first exchanger stage a surface ratio between the cooling part and the heating part is to be achieved which is as high as possible. The ribs in the cooling part are spaced relatively close together, in order to achieve the necessary large exchanger surface. Cleaning of the heat tube sections to which carrier gas is admitted is also made easier.

While the heat tube sections in the heating part of the first exchanger stage have no ribs, the second exchanger stage of, for example, altogether three exchanger stages, advantageously already has heat tube sections with ribs in the heating part. However, in view of the fact that the second exchanger stage still has a certain residual risk of contamination and the depositing of components, the spacing between ribs is greater in the heating part than in the cooling part. Any cleaning which may become necessary is also made simpler as a result.

The third exchanger stage which is located immediately upstream of the catalyst, also called the end stage, which preferably operates in the temperature range above 130° C. and, therefore, only processes substantially dry carrier gases, may have in the heating part as well as in the cooling part heat tub sections with high-efficiency ribs of identical size and equal spacings.

Since the temperature in the heating part of the first exchanger stage is still low and since the acid droplets carried by the carrier gas are highly aggressive as a result, the heat tube sections without ribs advantageously are of a corrosion-resistant material.

It may also be advantageous in this connection to provide the heat tube sections without ribs with a plastic coating of an acid-resistant material. This material may be polytetrafluoroethylene, polyvinyliden fluoride or polyfluoroethylene.

Since the carrier gas in the heating part of the first exchanger stage in flow direction of the carrier gas contains residue droplets or solid particles of the product and additionally carries aggressive acid components and other residues which may pose a risk, the first exchanger stage acts as safety stage and preliminary filter and is coupled additionally with at least one washing and cleaning unit.

In accordance with another feature of the invention, the heat tubes of each exchanger stage can be exchangeably mounted individually or in groups in an intermediate wall which separates the gas duct which conducts the carrier gas from the gas duct which conducts the purified gas. As a result, either each heat tube individually or heat tubes which form a group can be replaced as necessary without problems. The overall arrangement is further simplified as a result of the fact that the heat tubes are mounted in the intermediate wall which separates the gas duct which conducts the carrier gas from the gas duct which conducts the purified gas.

Another feature of the present invention provides that the heat tubes are provided in the middle of the length thereof either individually or in groups with circumferential conical support collars which are replaceably mounted in recesses of the intermediate wall which separates the gas duct which conducts the carrier gas from the gas duct which conducts the purified gas, wherein the shape of each recess is adapted to the shape of the support collars. This feature makes it particularly simple to exchange the heat tubes. The conical shape of the support collars, on the one hand, and the shape of the recesses in the intermediate wall, on the other hand, make it possible to completely seal the gas duct which conducts the carrier gas from the gas duct which conducts the purified gas and to select this support of the heat tubes as a fixed point for the thermal expansion of the heat tubes. Accordingly, the heat tubes can then freely expand to both sides under the influence of different temperatures.

In accordance with another feature, the support collars can be fitted with conical surfaces into the recesses. When the heat tubes are arranged vertically, this fitting can be carried out exclusively by the force of gravity.

On the other hand, when the heat tubes are mounted approximately horizontally, i.e., at an angle of about 3° to 5°, the support collars can be fitted in the recesses by means of an adaptable spring force. The sealing fit is in this case ensured by at least one pressing spring.

In accordance with a further feature, the heat support collars may have a conical thread which can be tightly screwed into the corresponding recess.

Another advantageous feature of the present invention provides that the regions next to the exchanger stages and the catalyst, tightly closeable maintenance openings are provided in the walls of the gas ducts which carry the carrier gas and the purified gas. This feature serves to eliminate the residual risk which is due to the fact that product residues or other harmful components are carried in the carrier gas. The easily accessible maintenance openings make possible a problem-free inspection and any necessary cleaning immediately at the respective locations.

Compensators may be integrated in the gas duct which conducts the carrier gas or in the gas duct which conducts the purified gas. This feature takes into consideration the different expansion behavior of the individual gas duct sections because of the different temperatures in the gas duct sections.

Finally, another feature of the invention provides that a heat exchanger is integrated in the gas duct which conducts the purified gas between the catalyst and the cooling part of the exchanger stage adjacent the catalyst. As a result, heat can be coupled out from the purified gas which leaves the catalyst. This is done, for example, if the temperature of the carrier gas has been raised in the catalyst to a level which makes it likely that the purified gas after flowing through the cooling parts of all exchanger stages has a temperature which is higher than the temperature with which the purified gas is to be conducted into the stack.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENT

Figure 1:
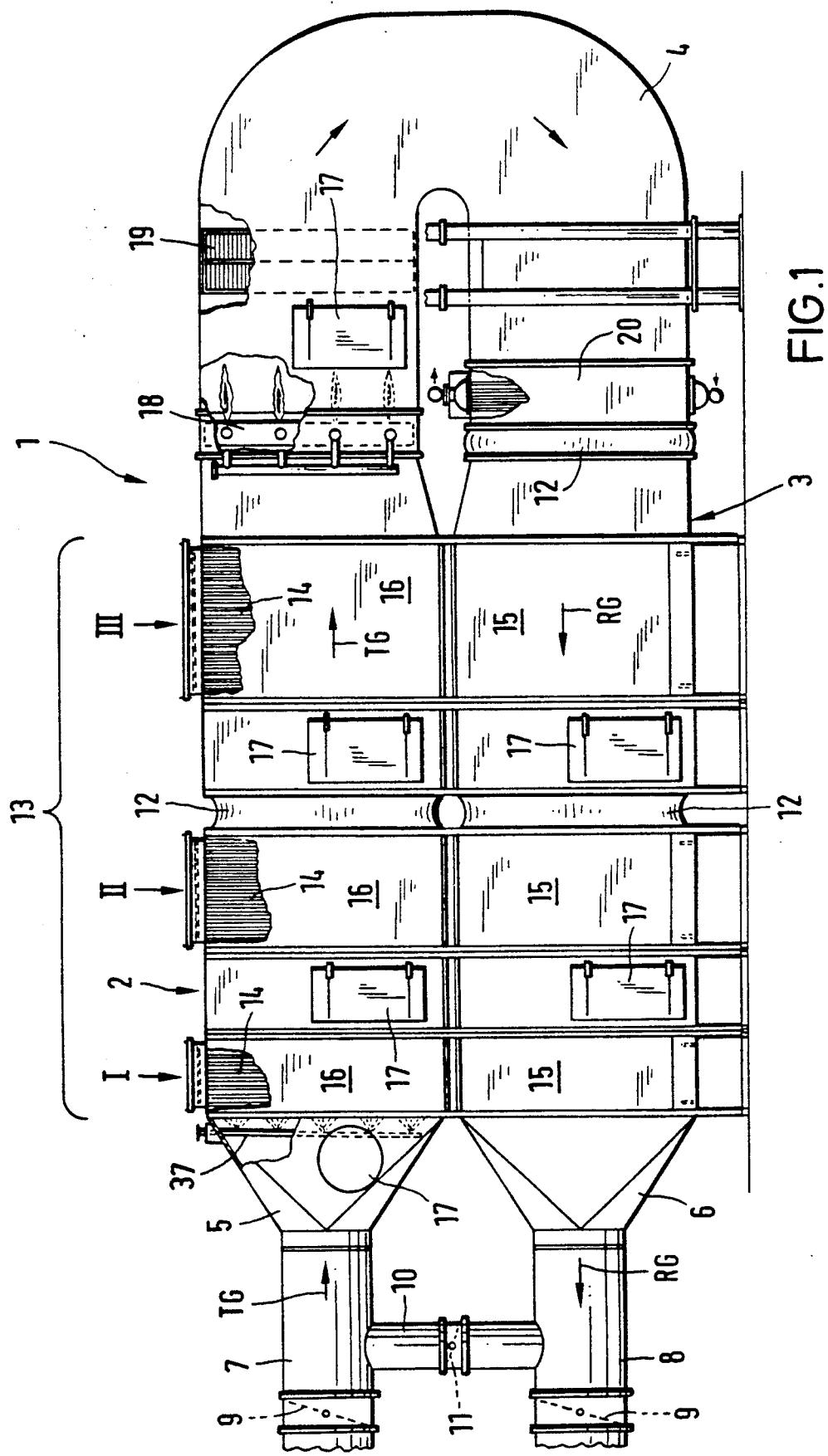
FIG. 1 is a side view, partly in section, of an arrangement for the catalytic oxidation of a carrier gas in a technical process.

FIG. 1 of the drawing shows an arrangement 1 for the catalytic oxidation of the environmentally harmful components of a cooled carrier gas TG of a chemical-technical or physical-technical process. This process may be, for example, the manufacture of phthalic anhydride.

The arrangement 1 includes two straight gas ducts 2, 3 which extend parallel to each other. At one end, the gas ducts 2, 3 are connected to each other through a U-shaped bend 4. The gas duct 2 serves to conduct the carrier gas TG and the gas duct 3 serves to conduct a purified gas RG. The other ends of the gas ducts 2, 3 are connected through conical pipe pieces 5, 6 to gas lines 7, 8 having a smaller diameter. Closing flaps 9 are integrated in the gas lines 7, 8. Between the closing flaps 9 and the conical pipe pieces 5, 6, the gas lines 7, 8 can be connected to each other through a transverse line 10. A closing flap 11 is integrated in the transverse line 10.

Compensators 12 are provided along the length of the gas ducts 2, 3 in order to take into account different thermal expansions of individual duct portions.

The gas ducts 2, 3 are connected to each other in a heat-transferring manner through a three-stage thermal energy return arrangement 13. Each exchanger stage I, II, III of the thermal energy return arrangement 13 is composed of a plurality of heat tubes 14 which transversely extend through the gas ducts 2, 3. Thus, each exchanger stage I, II, III includes a cooling part 15 in the gas duct 3 and a heating part 16 in the gas duct 2 In the embodiment illustrated in FIG. 1, the first exchanger state I adjacent the conical pipe pieces 5, 6 has eleven rows of tubes, the second exchanger stage II arranged spaced apart from the first exchanger stage I has twenty-two rows of tubes and the third and last exchanger stage III (end stage) has thirty-three rows of heat tubes 14.

Tightly closeable maintenance openings 17 are provided in the walls of the gas ducts 2, 3 adjacent the exchanger stages I, II, III.

As FIG. 1 further shows, a gas burner 18 is integrated in the ga duct 2 downstream of the heating part 16 of the third exchanger stage III. A catalyst 19 is mounted spaced from the gas burner 18. Another tightly closeable maintenance opening 17 is arranged in the wall of the gas duct 2 between the gas burner 18 and the catalyst 19.

Finally, FIG. 1 also shows that an additional heat exchanger 20 is mounted in the gas duct 3 between the bend 4 connecting the two gas ducts 2, 3 and the cooling part 15 of the last exchanger stage III.

Figure 2:
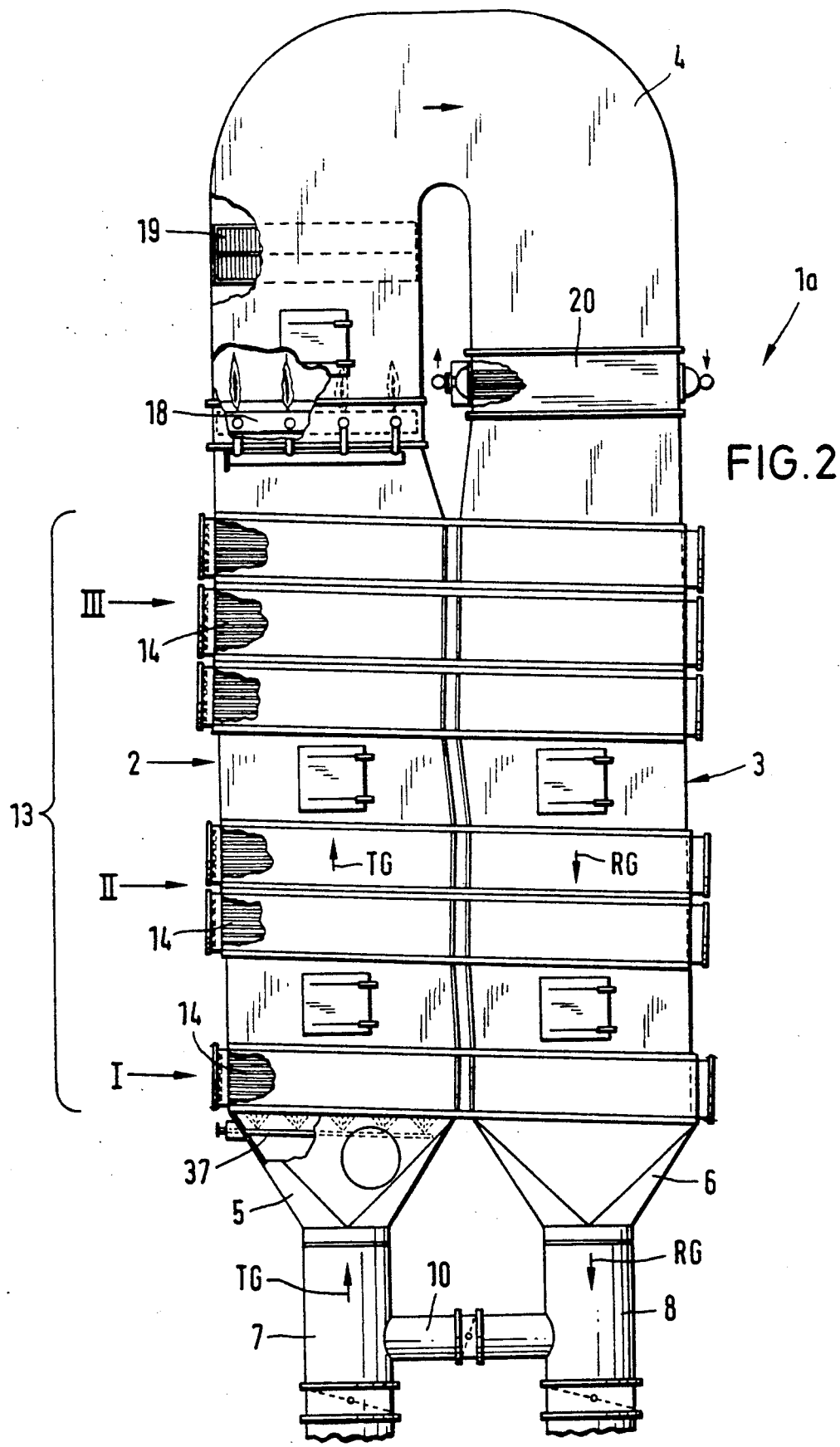
FIG. 2 is a side view, partly in section, of another embodiment of an arrangement for the catalytic oxidation of a carrier gas produced by a technical process.

The arrangement 1a for the catalytic oxidation of th environmentally harmful components of a carrier gas from a technical process shown in FIG. 2 corresponds essentially to the arrangement 1 of FIG. 1. The arrangements differ in that the arrangement 1a is mounted vertically and that the heat tubes 14 in the three exchanger stages I, II, III are inclined relative to the horizontal by an angle of about 3° to 5°. Also, the compensators 12 are not provided.

Figure 3:
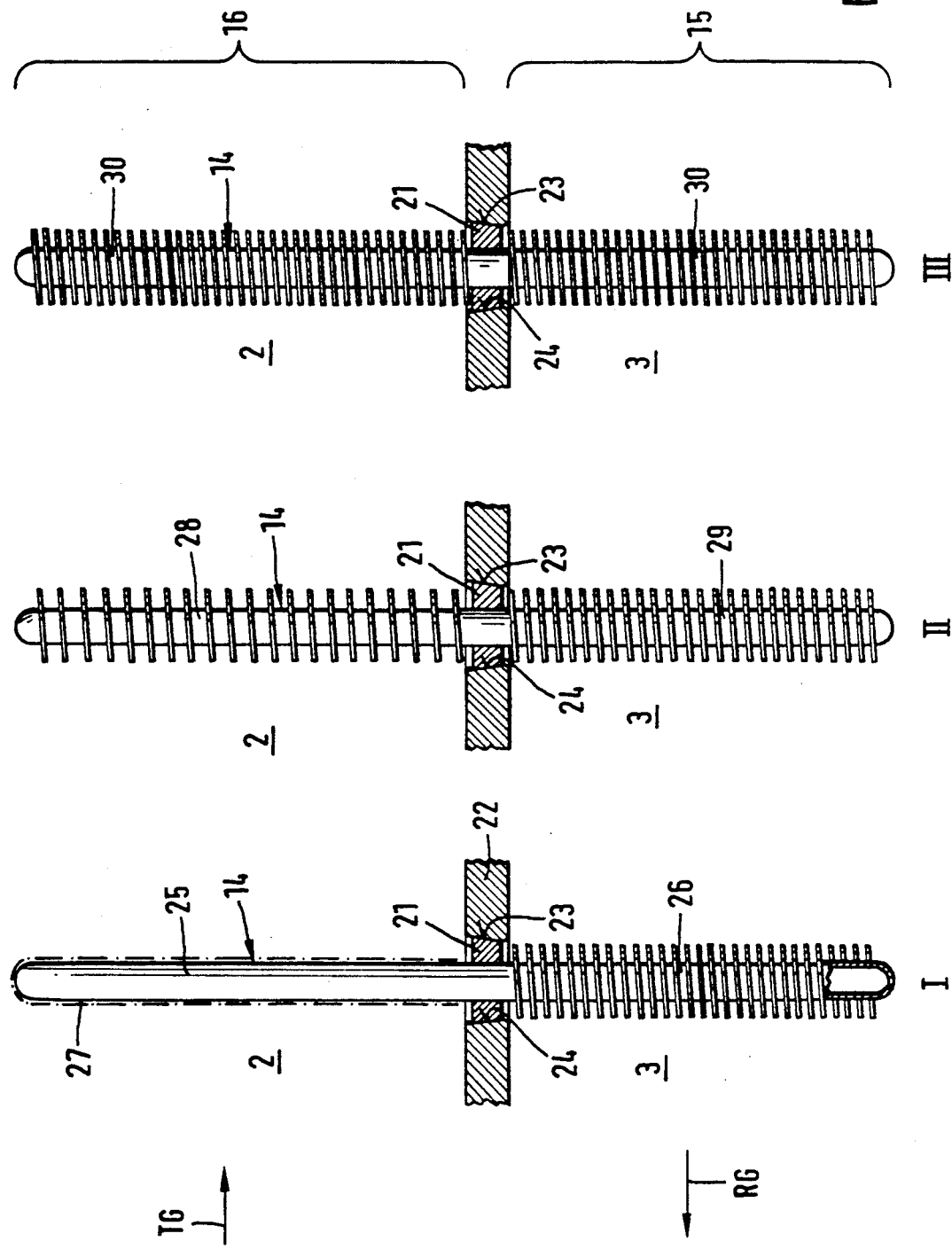
FIG. 3 is a schematic representation, on a larger scale, of the construction and mounting of the heating tube used in the arrangement of FIG. 1.

FIG. 3 of the drawing shows how the heat tubes 14 are mounted in the three exchanger stages I, II, III of the arrangement 1. As FIG. 3 shows, the heat tubes 14 have in the middle of the length thereof support collars 21 which are replaceably fitted in the intermediate wall 22 which separates the gas duct 2 which conducts the carrier ga TG from the gas duct 3 which conducts the purified gas RG. The support collars 21 have at the circumference thereto conical surfaces 23 which are adapted to recesses 23 in the intermediate wall 22.

As FIG. 3 further shows, the heat tube sections 25 in the heating part 16 of the first exchanger stage I in flow direction of the carrier gas TG have no ribs, while the heat tube sections 26 in the cooling part 15 are provided with ribs. The heat tube sections 25 without ribs are of a corrosion-resistant material. As indicated by dash-dot lines, the heat tube sections 25 without ribs may be provided with a plastic coating 27 of an acid-resistant material.

The heat tubes 14 of the second exchanger stage II have ribs in the cooling part 15 as well as the heating part 16. However, the spacing between the ribs in the heat tube sections 29 in the cooling part 15 is smaller than in the heat tube sections 28 in the heating part 16, so that the heat-exchanging surface area of the heat tube sections 29 in the cooling part 15 is greater than that of the heat tube sections 28 in the heating part 16.

In the third and last exchanger stage II, the heat tube sections 30 in the heating part 16 and in the cooling part 15 are equipped with ribs which are identical with respect to size and spacings.

Figure 4:
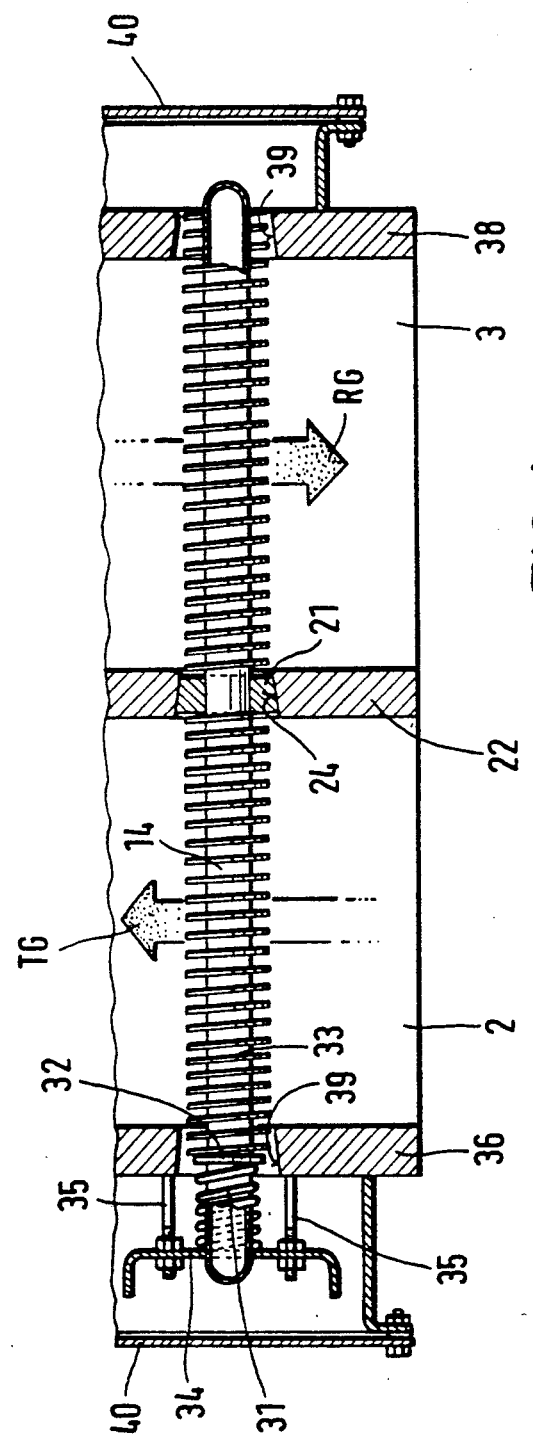
FIG. 4 shows the construction and mounting of a heat tube of the arrangement of FIGS. 2.

As can be seen in FIG. 4, in the arrangement 1a of FIG. 2 in which the heat tubes 14 are arranged slightly inclined relative to the horizontal, the support collars 21 are fitted into the recesses 24 of the intermediate wall 22 by a spring 31 which rests against the ribs 33 of the heat tube 14 through a plate 32, on the one hand, and against an abutment 34, on the other hand, wherein the abutment 34 is fixed to the outer wall 36 of the gas duct 2 by means of threaded bolts 35. In this case, the heat tubes 14 extend through the outer wall 36 of the gas duct 2 as well as through the outer wall 38 of the gas duct 3. The openings 39 in the outer walls 36 and 38 which in size correspond to the ribs 33 are hermetically sealed to the atmosphere by means of attached housings 40.

As FIGS. 1 and 2 additionally show, a washing and cleaning unit 37 is arranged upstream of the heat tube sections 25 in the heating part 16 of the first exchanger stage I in flow direction of the carrier gas TG.

In practical use, the carrier gas TG produced by the main process is conducted through the gas line 7 and the conical pipe piece 5 into the gas duct 2. Since the startup temperature of the catalyst 19 is somewhat below 300° C., it is necessary to preheat the carrier gas TG at the beginning of the heat exchanging process initially by means of the gas burner 18 upstream of the catalyst 19 and to conduct the gas several times in a closed cycle through the arrangements 1, 1a. For this purpose, the closing flaps 9 in the gas lines 7,8 are closed and the closing flap 11 in the transverse line 10 is open. When the carrier ga TG has reached the necessary temperature, the closing flap 11 in the transverse line can be closed and the closing flaps 9 in the gas lines 7, 8 are opened. The carrier gas TG then flows through the individual heating part 16 of the exchanger stages I, II and III and is heated stage by stage to the operating temperature of the catalyst 19.

Heat is removed from the purified gas RG which leaves the catalyst 19 in the cooling parts 15 of the exchanger stages I, II, III and this heat is transferred to the heating parts 16 through the heat tubes 14. In this manner, the carrier gas TG can be heated to the required operating temperature of the catalyst 19, while the purified gas RG is cooled to a temperature which makes it possible to transfer the purified gas RG to the stack with the desired temperature of about 100° C. to 120° C.

If the carrier gas TG has been heated in the catalyst 19 to such a temperature that the purified gas RG has after flowing through the cooling part 15 of the exchanger stages I, II and III a temperature which is above the temperature of about 100° C. to 120° C. which is advantageous for the discharge into the atmosphere, such a quantity of heat is coupled out from the purified gas RG through the heat exchanger 20 that the desired discharge temperature can be ensured.

While specific embodiments of the invention have been shown and described in detail to illustrate the inventive principles, it will be understood that the invention may be embodied otherwise without departing from such principles.

We claim

1. In an arrangement for catalytic oxidation of environmentally harmful components in a cooled carrier gas from a technical process, wherein purified gas to be transferred to the atmosphere is in heat-exchanging contact downstream of the catalyst with the carrier gas upstream of the catalyst through a multi-pass heat exchanger, the improvement comprising a gas duct for conducting the carrier gas and a gas duct for conducting the purified gas, the gas ducts extending parallel to each other, a thermal energy return unit for connecting the gas ducts to each other, the thermal energy return unit having at least two stages and including heat tubes, the exchanger stages each having a heating part in the flow duct for the carrier gas and a cooling part in the flow duct for the purified gas, wherein a size ratio of heat-exchanging surface areas of heating part relative to cooling part of each exchanger stage decreases in flow direction of the carrier gas from exchanger stage to exchanger stage, and wherein the catalyst is mounted immediately downstream of the heating part of the last exchanger stage.

2. The arrangement according to claim 1, wherein the number of heat tubes increases from exchanger stage to exchanger stage in flow direction of the carrier gas.

3. The arrangement according to claim 1, wherein the heating parts and the cooling parts have heat tube sections, wherein the heat tube sections of the first exchanger stage in flow direction of the carrier gas is smooth surfaced and the heat exchanger sections of the cooling part of the first exchanger stage in flow direction of the carrier gas is provided with ribs.

4. The arrangement according to claim 3, wherein the smooth heat tube sections are of a corrosion-resistant material.

5. The arrangement according to claim 3, wherein the smooth heat tube sections are coated with a plastic coating of an acid-resistant material.

6. The arrangement according to claim 3, wherein a washing and cleaning unit is provided for at least the heat tube sections in the heating part of the first exchanger stage in flow direction of the carrier gas.

7. The arrangement according to claim 3, wherein the heat tubes of each exchanger stage are replaceably mounted individually or in groups in an intermediate wall, the intermediate wall separating the gas duct for the carrier gas from the gas duct for the purified gas.

8. The arrangement according to claim 7, wherein the heat tubes have circumferentially extending conical support collars mounted individually or in groups on a middle length portion of the heat tubes, the intermediate wall defining recesses having the same size as the support collars, the support collars being replaceably mounted in the recesses.

9. The arrangement according to claim 8, wherein the support collars are fitted with conical surfaces in the recesses.

10. The arrangement according to claim 8, wherein the support collars are fitted in the recesses by means of an adjustable spring.

11. The arrangement according to claim 8, wherein the support collars have conical threads, the conical threads being screwed into the recesses.

12. The arrangement according to claim 1, comprising tightly closeable maintenance openings in walls of the gas ducts for the carrier gas and the purified gas wherein the maintenance openings are provided adjacent each exchanger stage and adjacent the catalyst.

13. The arrangement according to claim 1, comprising compensators mounted in the gas duct for the carrier gas.

14. The arrangement according to claim 1, comprising compensators mounted in the gas duct for the purified gas 15. The arrangement according to claim 1, comprising a heat exchanger mounted in the gas duct for the purified gas between the catalyst and the cooling part of the exchanger stage adjacent the catalyst.

* * * * *